May 18, 1937. E. M. BLUE 2,081,102
MEASURING DEVICE FOR ROPES AND THE LIKE
Filed May 21, 1934 4 Sheets-Sheet 1
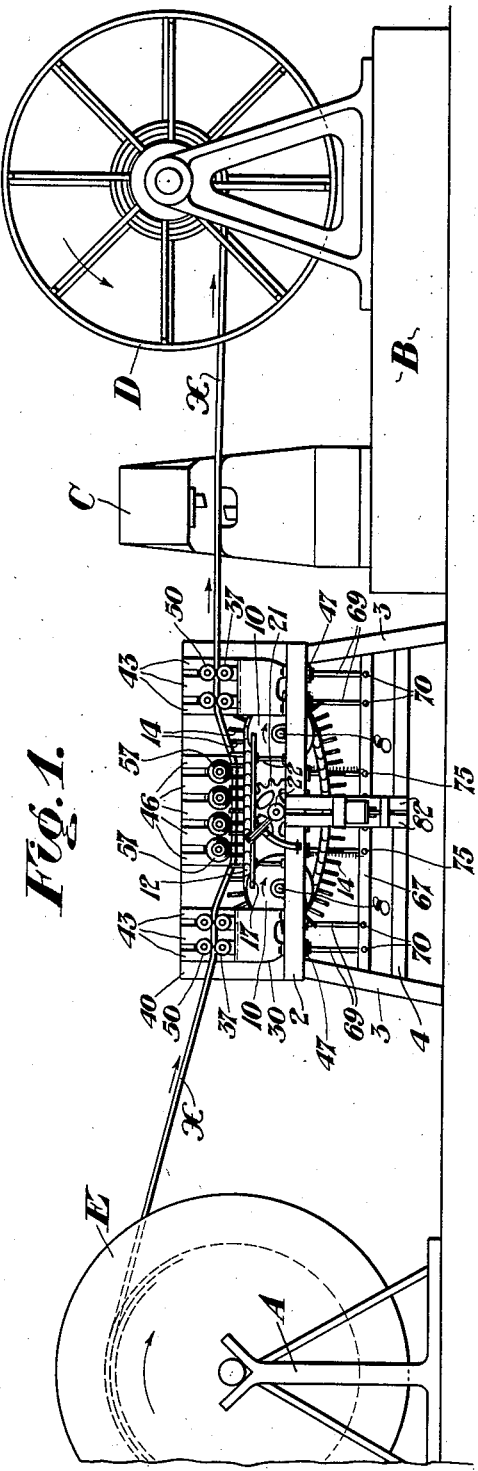
Inventor:
ERNEST M. BLUE,
by: his Attorneys.

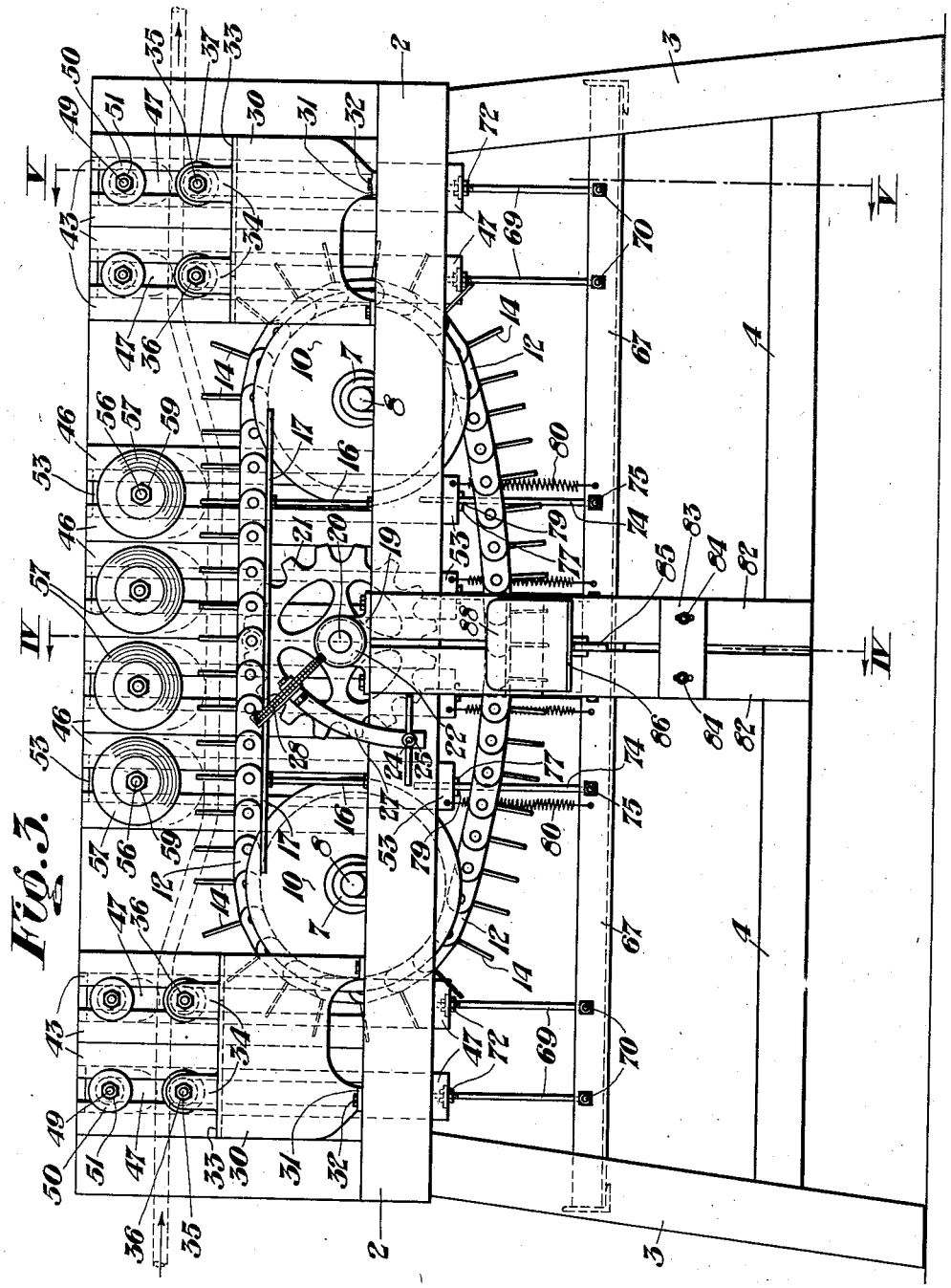

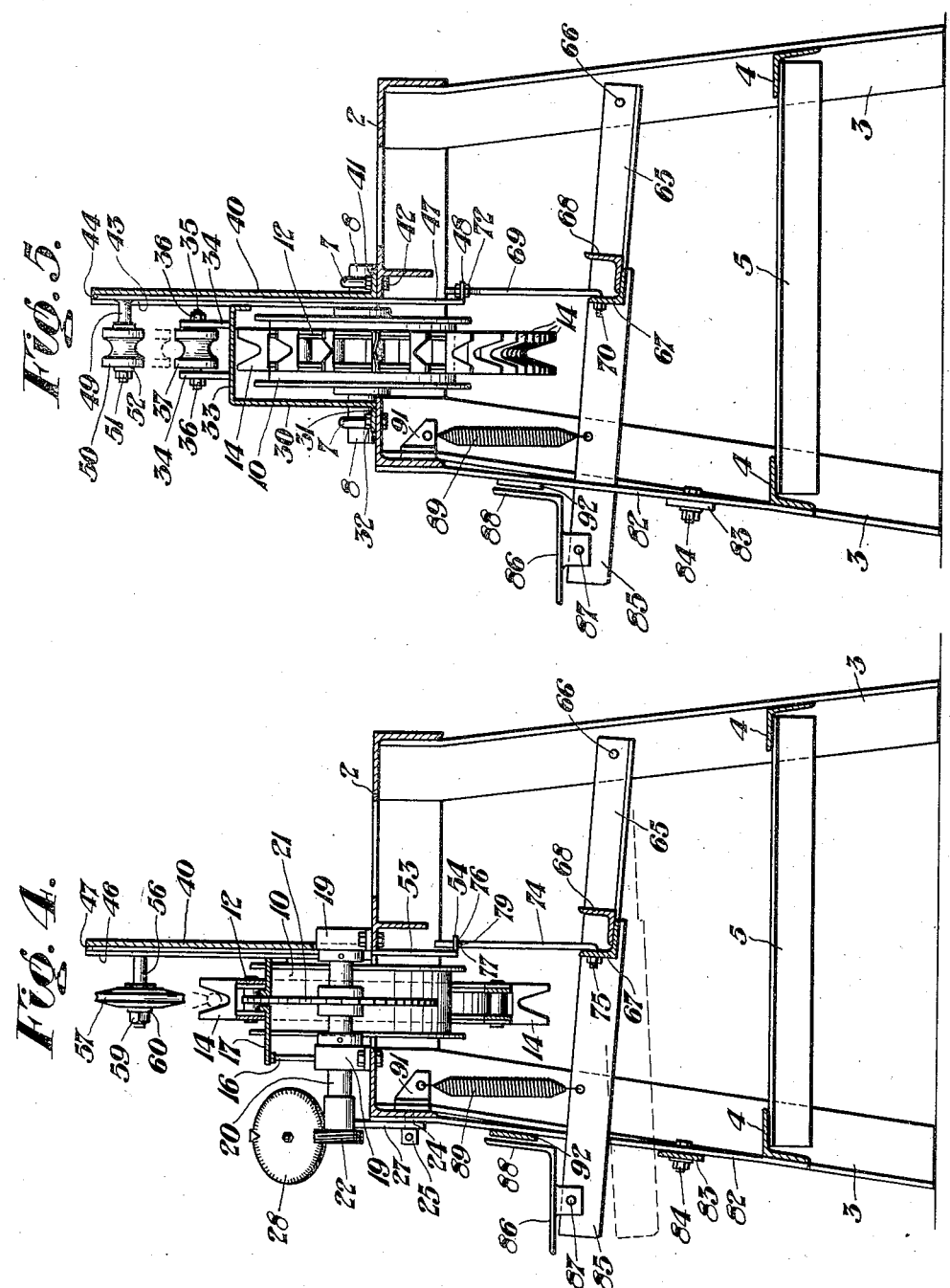

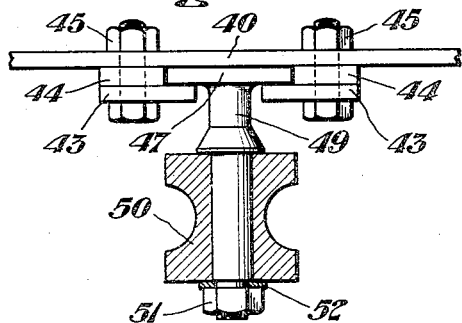
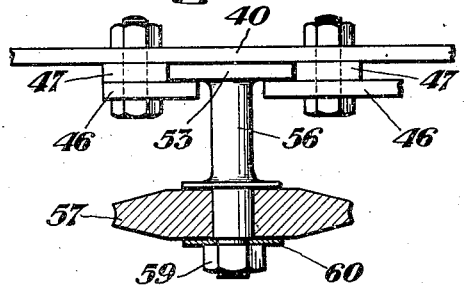
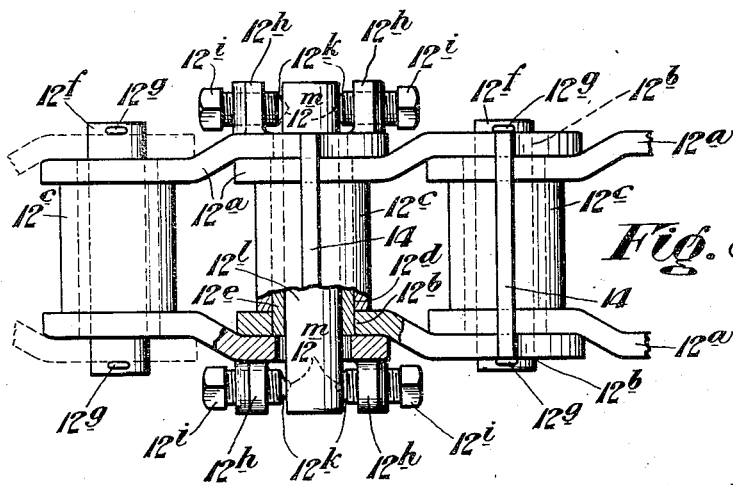
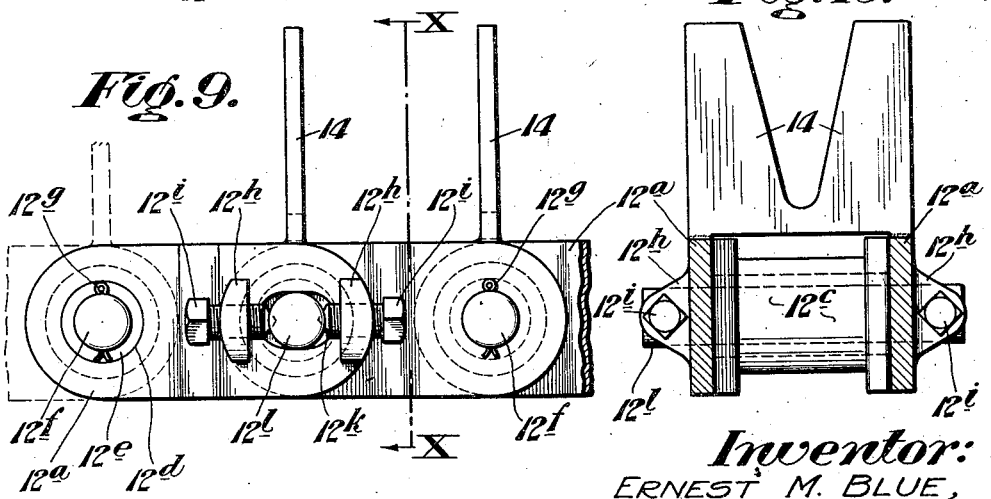

Patented May 18, 1937

2,081,102

UNITED STATES PATENT OFFICE 2,081,102

MEASURING DEVICE FOR ROPES AND THE LIKE

Ernest M. Blue, Houston, Tex., assignor to The American Steel and Wire Company of New Jersey, a corporation of New Jersey Application May 21, 1934, Serial No. 726,787

4 Claims. (Cl. 33—134)

This invention relates to a measuring device for ropes and the like, and has among its objects the provision of novel means for procuring an exact linear measurement, and one which at the same time may be inexpensively manufactured.

In using practically any of the devices of the prior art, the exact linear measurement of rope and the like is impossible to obtain, due largely to slippage. When the rope is heavily lubricated externally, the lubricant adheres to the measuring wheel of these devices and increases its diameter, causing additional inaccuracy. The speed at which the rope is drawn through conventional measuring devices also has a decided influence on their accuracy.

According to the teachings of the present invention, the rope may be heavily coated with lubricant and drawn through the device at any rate of speed without influencing its ability to obtain an exact linear measurement.

The foregoing and further objects will be apparent after referring to the drawings, in which:

Figure 1 is a side elevation of the device of the present invention, as used in combination with pay-off and take-up reels and a shearing device.

Figure 2 is a plan of the showing of Figure 1.

Figure 3 is an enlarged side elevation.

Figure 4 is a sectional view on the line IV—IV of Figure 3.

Figure 5 is a sectional view on the line V—V of Figure 3.

Figures 6, 7 and 8 are fragmentary details of some of the elements of the device of the invention, and are shown partly in section.

Figure 9 is a side elevation of the detail of Figure 8.

Figure 10 is a sectional view on the line X—X of Figure 9.

Referring more particularly to the drawings, the numerals 2 and 3 designate a table and legs, respectively, which comprise, for the most part, a stand for the devices of the present invention. The legs 3 are reenforced with longitudinal and lateral braces 4 and 5, respectively, which are composed of suitable structural shapes, preferably angle irons.

The table 2 supports two pairs of clamps 7, in each pair of which there is stationarily secured a shaft 8. A chain drum 10 is journaled on each of the shafts 8 for supporting an endless traveling belt or chain 12, which is preferably of the "link-and-roller" type. Each pair of links of the belt 12 has secured thereto, and preferably in an integral manner, an upwardly extending V-notched plate 14. A pair of vertically extending rods 16 are secured to the upper portion of the table 2 and support a substantially smaller table 17 which is composed of a suitable wear-resistant material, and adapted to contact the lower surface of the upper portion of the chain 12 while it is traveling in its upward horizontal path between the chain drums 10.

A pair of journals 19 are secured to the table 2 at a position intermediate the clamps 7, and rotatably support, at a position intermediate the chain drums 10, a shaft 20 having secured thereto a sprocket 21. One end of the shaft 20 is made to extend from one of the journals 19, and has secured thereto a worm 22. The table 2 is slotted, as at 24, and carries a bolt 25 for the purpose of adjustably clamping a curved support 27. A conventional type of indicating mechanism 28 is secured to the upper portion of the curved support 27, and is of such construction that it may be driven from the adjacent worm 22.

It has been found in practice that a type of indicating mechanism having a front counter wheel which is provided with one hundred teeth, together with an independently mounted rear counter wheel which is provided with ninety-nine teeth, will function very efficiently and in such manner that both may be operated by the worm 22 on the shaft 20 to record units of one and one hundred feet, respectively. It is to be understood, however, that the apparatus of the present invention contemplates numerous types of indicating mechanism, and is not limited to the construction described.

On either end of the table 2 there is disposed a housing composed of a vertical plate 30 having a lower flange 31, which is bolted to the table as shown at 32, and an upper lateral extension 33. The lateral extensions 33, on the vertical plates 30, each carry a plurality of pairs of supports 34, between each of which there is connected a shaft 35 which is held in position by means of a nut 36 threaded on each of its ends. A grooved roller 37 is journaled on each of the shafts 35 for guiding the cable to be measured.

A vertically extending continuous plate 40 is provided with a flange 41 which is adapted to be bolted, as at 42, to the table 2 at a position on the opposite side of the chain drums 10 from that on which the indicating mechanism 28 is supported. The plate 40 is also provided with a plurality of pairs of vertical guideways 43, each pair of which extends upwardly adjacent one of the rollers 36 which are mounted on the vertical plates 30 on either side of the table 2, and are each spaced from the continuous plate by means of spacing-washers 44. The guideways 43 and spacing-washers 44 are rigidly bolted against the continuous plate 40, as at 45.

A plurality of pairs of vertically extending guideways 46 are similarly secured to the continuous plate 40 adjacent the wear resistant table 17. A strip 47 is mounted between each pair of vertical guideways 43 which are connected to the continuous plate 40 adjacent the rollers 36. Each of the strips 47 has a flange 48 on its lower end and carries, adjacent its upper end, a laterally extending shaft 49 on which there is mounted a grooved roller 50. The rollers 50 are held on the shafts 49 by means of nuts 51 which are threaded on their extremities, and interposed washers 52.

The vertical guideways 46 which are connected to the continuous plate 40 adjacent the wear resistant table 17 are provided with vertically movable strips 53 which are flanged on their lower ends, as at 54. The strips 53 each carry a laterally extending shaft 56 on which there is journaled a relatively narrow grooved roller 57 of greater diameter than the rollers 50. The rollers 57 are held on the shafts 56 by means of nuts 59, which are threaded on their extremities, and interposed washers 60.

A pair of angle irons 65 are pivoted, as at 66, to the legs 3 of the stand which are adjacent the continuous plate 40. An angle iron 67 is connected between the pivoted angle irons 65 and provided with a reenforcing backing-up angle 68. A plurality of rods 69 are connected to the angle iron 67, as shown at 70, and are each connected to the flanged end 48 of one of the end strips 47, as shown at 72.

A rod 74 is disposed immediately beneath each of the strips 53, and is connected to the angle iron 67, as shown at 75. The other end of each of the rods 74 is extended through an aperture 76 in the flanged end 54 of one of the strips 53. A pin 77 is made to extend through an aperture 79 in each of the rods 74 in such manner as to permit the flanges 54 on the strips 53 to rest thereon. A spring 80 is connected, adjacent each of the rods 74, to the strips 53 and the angle iron 67, in any suitable manner.

A pair of metallic strips 82 are connected to the front of the table 2, and to the front longitudinal brace 4, and are provided with a connecting plate 83, which may be adjustably secured thereto in any suitable manner, as by bolts 84. An operating lever 85 is connected to the midportion of the angle iron 67 and made to extend between the strips 82, the plate 83 serving as a stop therefor. A pedal 86 is pivoted as at 87 to the outward extremity of the operating lever 85 and provided with an upwardly extending flange 88. A spring 89 is secured to the operating lever 85, as shown at 90, and to a lug 91 which is connected to the table 2. A lock-plate 92 is connected between the strips 82 for receiving the upwardly extending flange 88 on the pedal 86 in such manner as to retain the same in depressed position against the influence of the spring 89.

Referring to Figures 8 and 9 of the drawings, the endless belt 12 is shown as comprising pairs of links 12$^a$ having apertures adjacent their ends, as at 12$^b$. A roller 12$^c$ is disposed between the ends of each pair of links 12$^a$ and the ends of the adjacent pair are arranged in overlapping relationship. The bores of the rollers 12$^c$, as shown at 12$^d$, are adapted to receive bushings 12$^e$ which extend therefrom on either end to enter the apertures 12$^b$ of the links with which they are in contact. The bushings 12$^e$ do not, however, extend into the apertures of the overlapping ends of the adjacent links. This provides for relative pivotal movement between the various pairs of links. A shaft 12$^f$ is extended through each of the bushings 12$^e$ and the apertures 12$^b$ in the ends of both pairs of links 12$^a$. The shafts 12$^f$ are suitably held in position, as by means of cotter pins 12$^g$. In order to compensate for wear between the shafts, bushings and apertures, at least one pair of links 12$^a$ is provided on each of its ends which overlap the adjacent pair with a pair of spaced lugs 12$^h$. The aperture 12$^b$ in this end of each of these links is between a pair of these lugs 12$^h$, and are each elongated horizontally. A screw 12$^i$ is threaded through each of the lugs 12$^h$ and each provided on their adjacent ends with pointed extremities 12$^k$. An elongated shaft 12$^l$ is disposed in the elongated apertures of the links carrying the lugs 12$^h$ on their overlapping ends, in lieu of one of the shorter shafts 12$^f$. The elongated shaft 12$^l$ is provided on each of its ends with a pair of diametrically opposed detents 12$^m$ in which the pointed extremities 12$^k$ of the screws 12$^i$ may seat. In this manner, the elongated shaft 12$^l$ may be made to assume a determined position with respect to the elongated apertures in the ends of the links carrying the lugs 12$^h$, and compensate for wear between the various parts. Due to this adjustment, the length of the endless belt 12 may be kept within finely defined limits, and thus eliminates the possibility of inaccuracy of the indicating mechanism 28, which might otherwise result.

The apparatus of the invention is shown, in Figures 1 and 2, as being disposed between a spool support A and a bed B upon which there is mounted a shear C and a reel D. A spool E is disposed on the spool support A and carries the rope or cable to be measured, which is indicated at X.

In operation, an operator assumes a position adjacent the operating lever 85 and indicating mechanism 28, and draws the rope or cable X from the spool E into and between the rollers 37 and 50 on the left-hand side of the apparatus. The rope is then drawn downwardly between the V-notched plates 14, on the endless belt 12, and the relatively narrow rollers 57, and brought upwardly and through and between the rollers 37 and 50 on the right-hand side of the apparatus. The rope X is drawn entirely out of the apparatus for several feet. The operator then depresses the pedal 86, which moves about its pivot 87, and depresses the operating lever 85 against the influence of the spring 89. The upwardly extending flange 88 on the pedal 86 may then be inserted behind the lock-plate 92, which will hold the operating lever 85 in depressed position. The depression of the operating lever 85 lowers the channel 67 and with it the rods 69 which are connected to the strips 47 on both ends of the table 12. This movement lowers the rollers 50 into contact with the upper surface of the rope X.

The rods 74 are lowered at the same time, bringing with them the pins 77, in the apertures 79, and permitting the downward movement of the strips 53. This movement permits the springs 80 to resiliently hold the relatively narrow grooved rollers 57 in contact with the rope and influence it into the V-notched plates 14. The pressure of the rollers 57 against the rope X is only sufficient to hold it snugly in the V-notched plates, the size and strength of the spring 80 being such as will not permit the rollers to abrade the cable or impose wear on the plates.

After the rollers 50 and 57 have been lowered into contact with the rope, the operator withdraws the cable back into the apparatus until its end is exactly at the right-hand edge of the continuous plate 40.

The indicating mechanism 28 is then set at zero and the rope is pulled through the apparatus by the reel D. When the indicating mechanism shows the desired length, the operator marks the rope at the right-hand edge of the continuous plate 40. He then depresses the pedal 86, and rapidly removes his foot, which disengages the upwardly extending flange 88 on the pedal to clear the lock-plate 92.

The spring 89 moves the angle iron 67 upwardly, bringing with it the rods 69 and 74, which raise the rollers 50 and 57, respectively. The operator then moves the rope into the shear C and cuts it on the mark he has previously made. The rope is then removed from the reel D and made ready for shipment.

It is to be noted that the rollers 37 and 50, which are adjacent the ends of the apparatus, are considerably elevated with respect to the V-notched plates 14 on the endless belt 12, and are substantially spaced therefrom in a longitudinal direction. This permits an angle of entry and exit which is such that the rope comes into and out of contact with the V-notched plates 14 only when they are absolutely perpendicular to its axis. This obviates a tendency on the part of the plates 14 to allow the rope to slip, or "crawl" forward in the preceding notches, and provides for an exactly identical speed of rope and endless belt 12.

While I have shown and described one specific embodiment of my invention, it will be understood that I do not wish to be limited exactly thereto, since various modifications may be made without departing from the scope of my invention, as defined in the following claims.

I claim:

1. A measuring device for ropes and the like comprising a stand, an endless traveling belt mounted on said stand, receiving elements carried by said belt, an indicator mechanism mounted on said stand and operated from said belt, at least one vertically movable roll mounted over said endless traveling belt, at least one roll mounted on either side of said belt, at least one vertically movable roll mounted over each of said last named rolls, a bar pivotally mounted on said stand beneath said endless belt, means connecting all of said vertically movable rolls with said bar, and a lever for depressing said bar.

2. A measuring device for ropes and the like comprising a stand, an endless traveling belt mounted on said stand, receiving elements carried by said belt, an indicator mechanism mounted on said stand and operated from said belt, at least one vertically movable roll mounted over said endless traveling belt, at least one roll mounted on either side of said belt, at least one vertically movable roll mounted over each of said last named rolls, a bar pivotally mounted on said stand beneath said endless belt, means connecting all of said vertically movable rolls with said bar, a lever for depressing said bar, and means for locking said lever in depressed position.

3. A measuring device for ropes and the like comprising a stand, an endless traveling belt mounted on said stand, receiving elements carried by said belt, an indicator mechanism mounted on said stand and operated from said belt, at least one vertically movable roll mounted over said endless traveling belt, at least one roll mounted on either side of said belt, at least one vertically movable roll mounted over each of said last named rolls, a bar pivotally mounted on said stand beneath said endless belt, means connecting all of said vertically movable rolls with said bar, a lever for depressing said bar, at least one spring for resisting said depression, and means for locking said lever in depressed position.

4. In a measuring device for ropes and the like, a movable endless belt, rope-receiving elements carried by said belt, means for guiding the rope toward the rope-receiving elements in a path which is out-of-line with respect to the path traveled by said rope-receiving elements when in rope-measuring position, means for deflecting said rope from said first path and for angularly introducing the same into engagement with said rope-receiving elements, the angle of introduction of said rope being such that its initial contact with said rope-receiving elements is only when said elements are in rope-measuring position, and an indicator operated by said belt.

ERNEST M. BLUE.